(12) United States Patent
Harty

(10) Patent No.: US 12,611,950 B2
(45) Date of Patent: Apr. 28, 2026

(54) ELECTRIC VEHICLE SUPPLY EQUIPMENT HYBRID ADAPTER HANDLE

(71) Applicant: Honda Motor Co., Ltd., Tokyo (JP)

(72) Inventor: Ryan Douglas Roy Harty, Long Beach, CA (US)

(73) Assignee: Honda Motor Co., Ltd., Tokyo (JP)

( * ) Notice: Subject to any disclaimer, the term of this patent is extended or adjusted under 35 U.S.C. 154(b) by 1065 days.

(21) Appl. No.: 17/708,429

(22) Filed: Mar. 30, 2022

(65) Prior Publication Data

US 2023/0311687 A1 Oct. 5, 2023

(51) Int. Cl.
| | |
|---|---|
| *B60L 53/35* | (2019.01) |
| *B60L 53/16* | (2019.01) |
| *B60L 53/62* | (2019.01) |
| *H01R 13/70* | (2006.01) |
| *H01R 13/71* | (2006.01) |
| *H01R 29/00* | (2006.01) |

(52) U.S. Cl.
CPC .............. *B60L 53/35* (2019.02); *B60L 53/16* (2019.02); *B60L 53/62* (2019.02); *H01R 13/701* (2013.01); *H01R 13/71* (2013.01); *H01R 29/00* (2013.01); *H01R 2201/26* (2013.01)

(58) Field of Classification Search
CPC ...... H01R 13/701; H01R 13/71; H01R 29/00; H01R 27/00; H01R 2201/26; B60L 53/35; B60L 53/62; B60L 53/16; B60L 53/60; B60L 53/65
See application file for complete search history.

(56) References Cited

U.S. PATENT DOCUMENTS

| | | | | |
|---|---|---|---|---|
| 9,873,347 | B2 * | 1/2018 | Brown .................... | B60L 53/36 |
| 9,908,425 | B2 * | 3/2018 | Prokhorov .............. | B60L 53/36 |
| 2022/0281334 | A1 * | 9/2022 | Xia .................... | H01R 13/6272 |
| 2024/0014613 | A1 * | 1/2024 | Gabrielsson ........... | H01R 27/00 |

FOREIGN PATENT DOCUMENTS

DE 102011106335 A1 * 1/2013 .......... B60L 11/1818

* cited by examiner

*Primary Examiner* — Renee S Luebke
*Assistant Examiner* — Paul D Baillargeon
(74) *Attorney, Agent, or Firm* — Rankin, Hill & Clark LLP

(57) ABSTRACT

A charging connector for providing power to a vehicle from a power source includes a connector body, a first charging portion, a second charging portion, and an actuator. The first charging portion is for charging the vehicle according to a first electric charge protocol and is movable between a first retracted state and a first extended state relative to the connector body. The second charging portion is for charging the vehicle according to a second electric charge protocol and is movable between a second retracted state and a second extended state relative to the connector body. The actuator is configured to selectively move the first charging portion between the first retracted state and the first extended state relative to the connector body, and the second charging portion between the second retracted state and the second extended state relative to the connector body.

19 Claims, 5 Drawing Sheets

ELECTRIC VEHICLE SUPPLY EQUIPMENT HYBRID ADAPTER HANDLE

BACKGROUND

Electric Vehicle Supply Equipment (EVSE) utilizes two-way communication between electrical chargers and electric vehicles (EVs) to control charging of EVs. The electrical chargers are standardized in North America by Society of Automotive Engineers (SAE) standard SAE J1772. The SAE J1772 charge protocol is configured to charge an electric vehicle using both AC current and DC current, which is referred to as SAE J1772 Type 1 Combined Charging System (CCS).

Unfortunately, SAE J1772 Type 1 CCS connectors are not interchangeable between AC only cars and AC/DC enabled cars. In a vehicle-to-grid system, where it is desirable to charge all EVs regardless of power protocol, the SAE J1772 Type 1 CCS connectors make it difficult for EVSE providers and/or charging stations to determine which type of connector to provide. Accordingly, a connector configuration that allows for a simple and seamless interface for switching between AC current and DC current seamless is desirable.

BRIEF DESCRIPTION

According to one aspect, a charging connector for providing power to a vehicle from a power source includes a connector body, a first charging portion within the connector body, a second charging portion within the connector body, and an actuator operatively connected to the connector body. The first charging portion is for charging the vehicle according to a first electric charge protocol. The first charging portion is movable between a first retracted state and a first extended state relative to the connector body. The second charging portion is for charging the vehicle according to a second electric charge protocol. The second charging portion is movable between a second retracted state and a second extended state relative to the connector body. The actuator is configured to selectively move the first charging portion between the first retracted state and the first extended state relative to the connector body, and the second charging portion between the second retracted state and the second extended state relative to the connector body.

According to another aspect, a charging system to charge a vehicle according to a first electric protocol and a second electric charge protocol includes a first charging portion, a second charging portion, and a control unit operatively connected for computer communication with the first charging portion and the second charging portion. The first charging portion has a first set of connector pins for charging the vehicle according to a first electric charge protocol. The first charging portion is movable between a first charging state and a first discharging state for engaging with the vehicle. The second charging portion has a second set of connector pins for charging the vehicle according to a second electric charge protocol. The second charging portion is movable between a second charging state and a second discharging state for engaging with the vehicle. The control unit selectively moves the first charging portion relative to the second charging portion.

According to a further aspect, a non-transitory computer-readable storage medium including instructions that when executed by a processor, causes the processor to receive a charging signal indicating a charge protocol for charging a vehicle. The instructions that when executed by a processor further causes the processor to control a position of a first charging portion relative to a position of a second charging portion based on the charge protocol. The first charging portion is capable of charging the vehicle according to a first electric charge protocol. The second charging portion is capable of charging the vehicle according to a second charge protocol

BRIEF DESCRIPTION OF THE DRAWINGS

The accompanying drawings, which are incorporated in and constitute a part of the specification, illustrate various systems, methods, devices, and other embodiments of the disclosure. It will be appreciated that the illustrated element boundaries (e.g., boxes, groups of boxes, directional lines, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figures 1A, 1B:
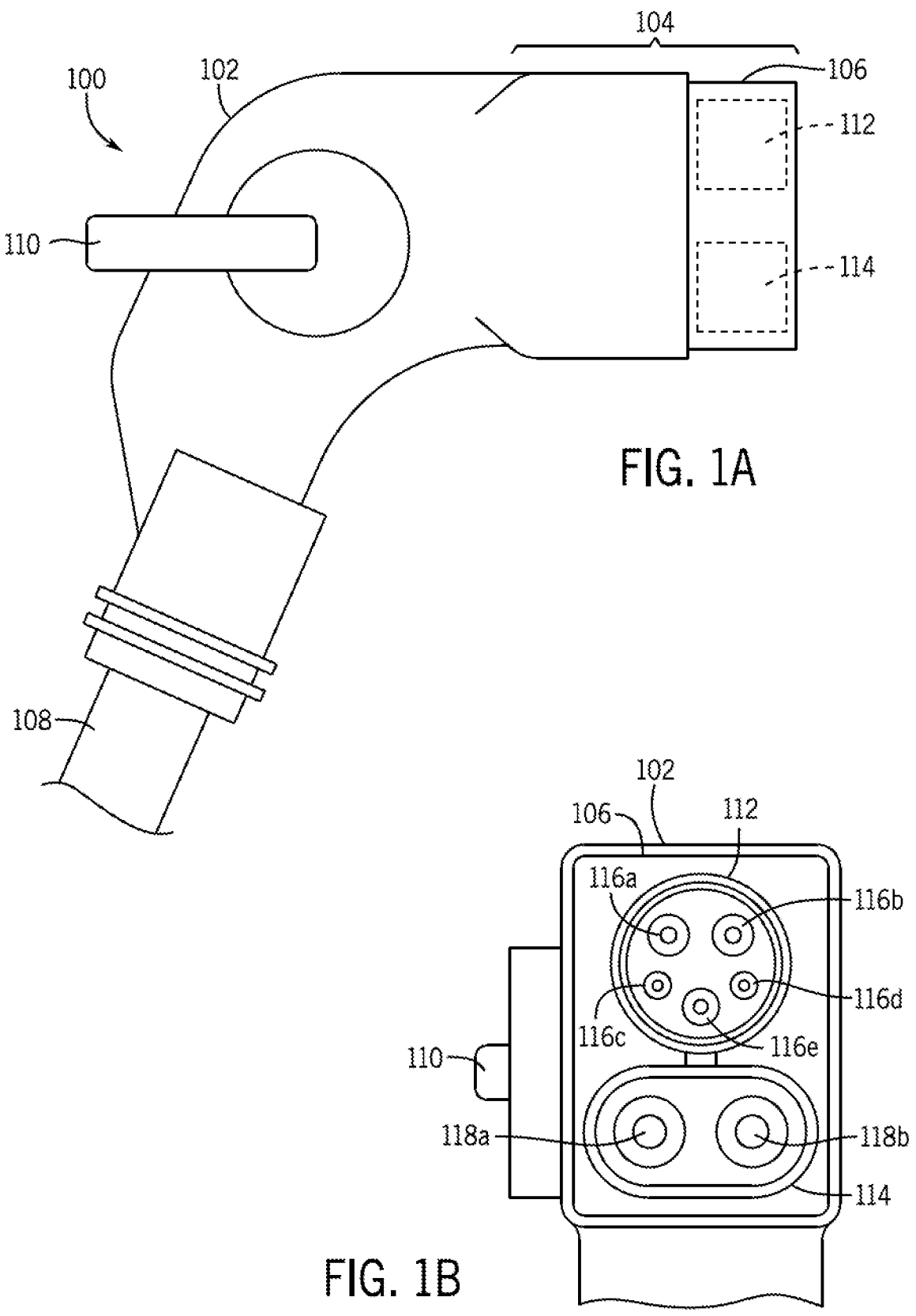
FIG. 1A is a schematic side view of a charging connector according to one exemplary embodiment.
FIG. 1B is a schematic front view of the charging connector of FIG. 1A according to one exemplary embodiment.

Referring now to the drawings, wherein the showings are for purposes of illustrating one or more exemplary embodiments and not for purposes of limiting same, FIG. 1A is a schematic side view of a charging connector 100 according to one exemplary embodiment. The charging connector 100 includes a connector body 102 for housing one or more components discussed herein. The connector body 102 has a connector head 104 with a charging interface 106 that extends from the connector body 102 to engage and/or mate with a respective receiving interface, for example, a vehicle and/or a charging port (see FIG. 4). The charging interface 106 includes a first charging portion 112 and a second charging portion 114.

The first charging portion 112 is capable of transferring power according to a first electric charge protocol. For example, in some embodiments, the first charging portion 112 is referred to as an AC charging portion that provides AC power. The second charging portion 114 is capable of transferring power according to a second electric charge protocol. For example, in some embodiments, the second charging portion 114 is referred to as a DC charging portion that provides DC power. In operation, the charging connector 100 transfers electric power through a cord 108 to the charging interface 106. An actuator 110 operatively connected to the connector body 102 is configured to selectively move one or more components of the charging interface 106 thereby allowing interchangeable charging between two different electric charging protocols from a single connector. In one example, which will be described in more detail herein, the actuator 110 can be selectively rotated to different positions where each position causes movement of one or more components (e.g., the first charging portion 112 and/or the second charging portion 114) of the charging interface 106. For simplicity of describing the components of the connector 100, FIG. 1A illustrates a neutral state, where the first charging portion 112 is parallel to the second charging portion 114 and both portions are flush to one another. However, as will be discussed in further detail herein, based on a selected charging protocol and/or in response to the actuator 110, the first charging portion 112 and/or the second charging portion 114 can be moved independently and/or relatively.

In the embodiments discussed herein, the connector 100 follows the industry protocols according to SAE J1772 Type 1 CCS. Accordingly, the connector 100 is configured to charge an electric vehicle using both AC current and DC current. This configuration will now be described in more detail with reference to FIG. 1B, which is a front view of the connector 100 of FIG. 1A and shows a detailed view of the first charging portion 112 and the second charging portion 114 in a neutral state. According to SAE J1772 Type 1 CCS, the first charging portion 112 includes a first set of connector pins 116, namely, a pin 116a, a pin 116b, a pin 116c, a pin 116c, a pin 116d, and a pin 116e. The second charging portion 114 includes a second set of connector pins 118, namely, a pin 118a and a pin 118b. The signals on each pin depend on the electric charge protocol provided by the connector 100, namely, the first electric charge protocol or the second electric charge protocol. Table 1 below indicates the signals configured to be received by each pin shown in FIG. 1B.

TABLE 1

| Pin | Signal |
| --- | --- |
| 116a | AC line 1 |
| 116b | neutral |
| 116c | control pilot |
| 116d | proximity detection |
| 116e | ground |
| 118a | DC+ |
| 118b | DC− |

Figures 2A, 2B:
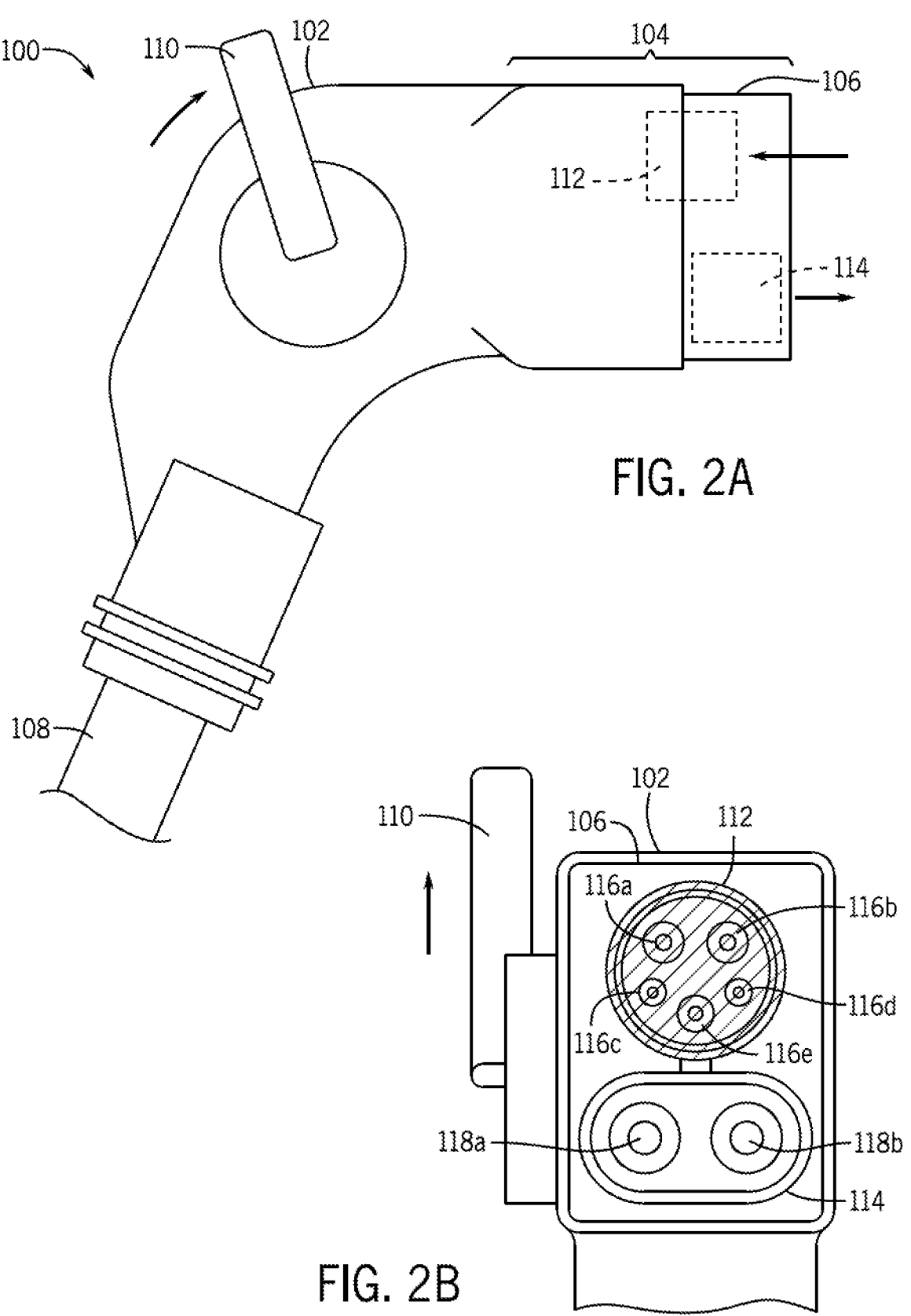
FIG. 2A is a schematic side view of a charging connector in a DC charge state according to one exemplary embodiment.
FIG. 2B is a schematic front view of the charging connector of FIG. 2A in a DC charge state according to one exemplary embodiment.
Figures 3A, 3B:
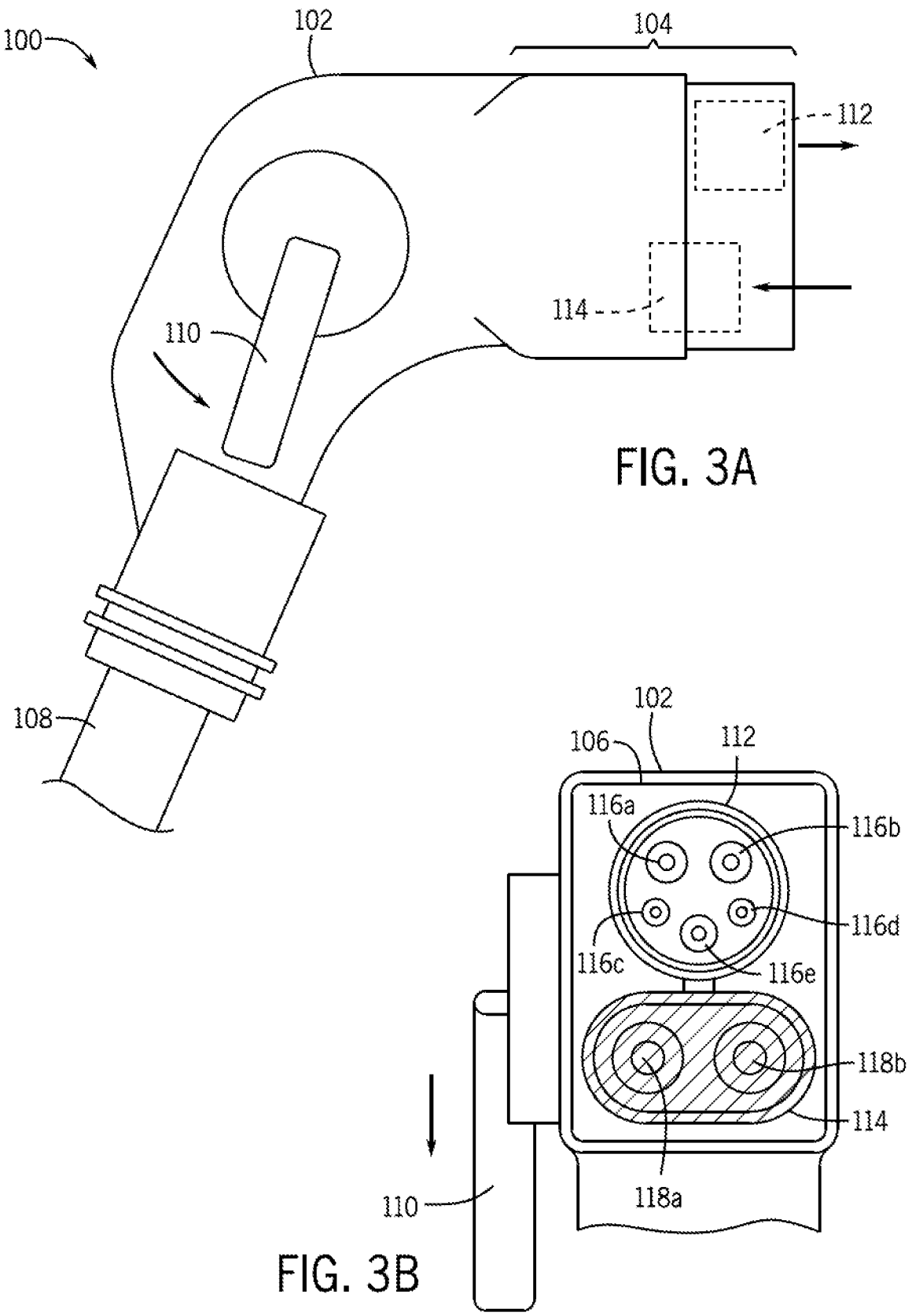
FIG. 3A is a schematic side view of a charging connector in an AC charge state according to one exemplary embodiment.
FIG. 3B is a schematic front view of the charging connector of FIG. 3A in an AC charge state according to one exemplary embodiment.

Operation of two different charging modes and/or states and application of the signals in Table 1 according to the charging modes will now be described in more detail. FIG. 2A is a schematic side view of the charging connector 100 in a DC charge state according to one exemplary embodiment, and FIG. 2B is a schematic front view of the charging connector 100 of FIG. 2A in the DC charge state according to one exemplary embodiment. In contrast, FIG. 3A is a schematic side view of the charging connector 100 in an AC charge state according to one exemplary embodiment, and FIG. 3B is a schematic front view of the charging connector 100 of FIG. 3A in the AC charge state according to one exemplary embodiment. For simplicity, like numerals described herein with FIGS. 1A and 1B identify like components in FIG. 2A, FIG. 2B, FIG. 3A, and FIG. 3B.

As shown in FIG. 2A, the first charging portion 112 is in a first retracted state relative to the connector body 102 and/or the second charging portion 114, and the second charging portion 114 is in a second extended state relative to the connector body 102 and/or the first charging portion 112. In this embodiment, the second charging portion 114, which provides power according to the second electric charge protocol (i.e., DC), is extended to engage and/or couple with a vehicle (see FIG. 4). Accordingly, when the second charging portion 114 is in the second extended position, the first charging portion 112 is in the first retracted position thereby coupling the second charging portion 114 with a vehicle and charging the vehicle according to the second electric charge protocol (i.e., DC).

When the second charging portion 114 is in the second extended state, electric signals are applied to activate and transfer the DC power. Accordingly, as shown in FIG. 2B, when the first charging portion 112 is in the first retracted state and the second charging portion 114 is in the second extended state, no signal is provided to the first set of connector pins 116, a DC + signal is provided to the pin 118a, and a DC − signal is provided to the pin 118b.

Referring now to FIG. 3A, the first charging portion 112 is in a first extended state relative to the connector body 102 and/or the second charging portion 114, and the second charging portion 114 in a second retracted state relative to the connector body 102 and/or the first charging portion 112. In this embodiment, the first charging portion 112, which provides power according to the first electric charge protocol (i.e., AC), is extended to engage and/or couple with a vehicle (see FIG. 4). Accordingly, when the first charging portion 112 is in the first extended position, the second charging portion 114 is in the second retracted position thereby coupling the first charging portion 112 with a vehicle and charging the vehicle according to the second electric charge protocol (i.e., AC).

When the first charging portion 112 is in the first extended state, electric signals are applied to activate and transfer the AC power. Thus, as shown in FIG. 3B, when the first charging portion 112 is in the first extended state and the second charging portion 114 is in the second retracted state signals are transmitted to the first set of connector pins 116, but not to the second set of connector pins 118.

As mentioned above, the actuator 110 can be used to effect movement of the first charging portion 112 and the second charging portion 114. This allows for seamless transitions between providing AC power and DC power. In one embodiment the actuator 110 is configured to rotate between a first position for charging the vehicle according to the first electric charge protocol, and a second position for charging the vehicle according to the second electric charge protocol. As shown in FIG. 2A, when the actuator 110 is moved into an upward position indicated by the arrow, the actuator 110 is in a second position. In response to the actuator 110 in the second position, the second charging portion 114 is caused to be moved to the second extended state and the first charging portion 112 is caused to be moved to the first retracted state thereby activating DC power transfer.

In contrast, and as shown in FIG. 3A, when the actuator 110 is moved downward as indicated by the arrow, the actuator 110 is in the first position. In response to the actuator 110 in the first position, the first charging portion 112 is caused to be moved to the first extended state and the second charging portion 114 is caused to be moved to the second retracted state thereby activating AC power transfer. The actuator 110 as shown in FIGS. 1-3 is a handle movably affixed to the connector body 102. However, the actuator 110 could be an electromechanical mechanism, and in some embodiments, can be controlled automatically, by for example, a control unit. An EVSE system including a control unit will now be described in more detail.

Figure 4:
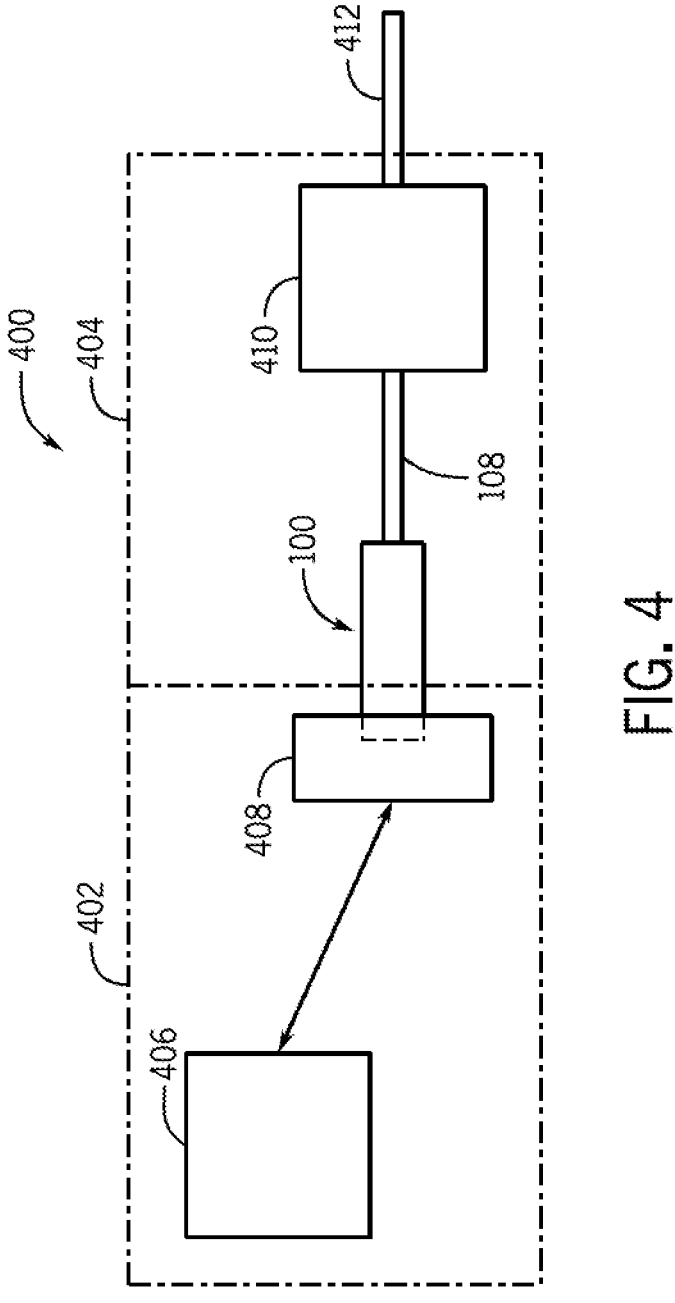
FIG. 4 is a block diagram of a charging system for charging an electric vehicle according to one exemplary embodiment.

FIG. 4 is a block diagram of a charging system 400 for charging a vehicle 402 using Electric Vehicle Supply Equipment (EVSE) 404, which includes the charging connector 100 and the cord 108 of FIGS. 1A, 1B, 2A, 2B, 3A, and 3B. In FIG. 4, the vehicle 402 includes an electronic control unit 406 operatively connected for computer communication to a charging port 408. The charging port 408 receives and/or engages with the charging connector 100. As discussed above in detail, the EVSE 404 receives electric power from a power source 412 and transfers it to the vehicle 402 through the cord 108 and the charging connector 100 that plugs into and/or engages with the charging port 408. The EVSE control unit 410 is operatively connected for computer communication to at least the connector 100 and the vehicle 402 (e.g., the electronic control unit 406). More specifically, in one embodiment, the EVSE control unit 410 is operatively connected for computer communication with the first charging portion 112 and/or the second charging portion 114 for selectively moving the first charging portion 112 relative to the second charging portion 114. It is understood that the EVSE control unit 410 could be located within the connector 100 or in a different location remote from the connector 100. Although not shown in FIG. 4, the EVSE control unit 410 can include a processor, memory, data stores, sensors, and other communication interfaces that facilitate the systems and methods described herein and allow for operable computer communication. It is understood that in some embodiments, the electronic control unit 406 could include one or more of the components of the EVSE control unit 410 for executing one or more of the functions described herein.

In the embodiment shown in FIG. 4, when the first charging portion 112 is in the first charging state the EVSE control unit 410 moves the first charging portion 112 into a first extended state relative to the second charging portion 114 thereby engaging with the vehicle 402 to charge the vehicle 402 according to the first electric charging protocol (i.e., DC). Likewise, when the second charging portion 114 is in the second charging state, the EVSE control unit 410 moves the second charging portion 114 into a second extended state relative to the first charging portion 112 thereby engaging with the vehicle 402 to charge the vehicle 402 according to the second electric charging protocol (i.e., AC). An exemplary method of control according to the charging system 400 will now be described in more detail.

Figure 5:
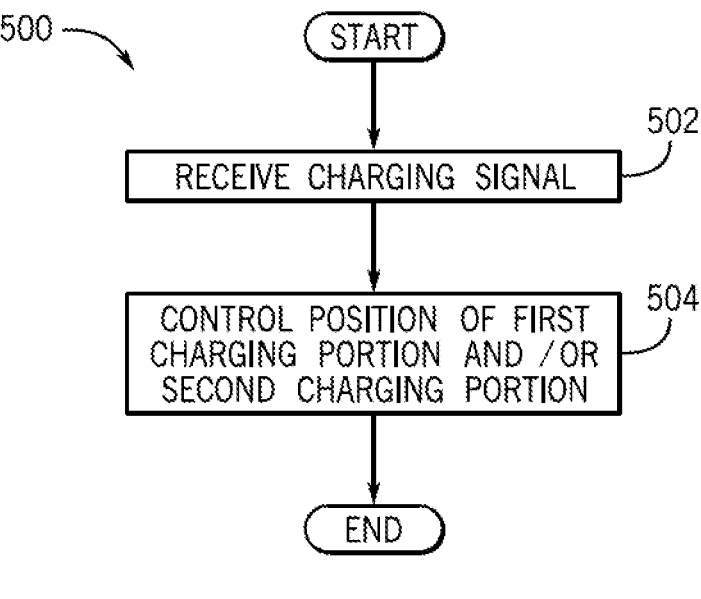
FIG. 5 is a method for charging according to an exemplary embodiment.

Referring now to FIG. 5, an exemplary method 500 for electric charging is shown. At block 502, the method 500 includes receiving a charging signal. In one embodiment, the EVSE control unit 410 receives a charging signal indicating an electric charge protocol for charging the vehicle 402. For example, the EVSE control unit 410 can receive the charging signal from the actuator 110, a remote third party (not shown) and/or the electronic control unit 406.

Accordingly, at block 504, the method 500 includes controlling a position of the first charging portion 112 relative to a position of the second charging portion 114 based on the charge protocol indicated by the charging signal. Thus, when the charge protocol is the first charging protocol, the EVSE control unit 410 controls the first charging portion 112 to extend. As illustrated above with FIGS. 3A and 3B, the EVSE control unit 410 controls the first charging portion 112 to extend into a first extended position and controls the second charging portion 114 to retract into a second retracted position. Accordingly, the first charging portion 112 engages with the vehicle 402 to charge the vehicle according to the first electric charging protocol.

Likewise, when the charge protocol is the second charging protocol, the EVSE control unit 410 controls the second charging portion 114 to extend. As illustrated above with FIGS. 2A and 2B, the EVSE control unit 410 controls the second charging portion 114 to extend into a second extended position, and controls the first charging portion 112 to retract into a first retracted position. Accordingly, the second charging portion 114 engages with the vehicle 402 to charge the vehicle according to the second electric charging protocol.

The embodiments discussed herein can also be described and implemented in the context of "computer-readable medium" or "computer storage medium." As used herein, "computer-readable medium" or "computer storage medium refers to a non-transitory medium that stores instructions, algorithms, and/or data configured to perform one or more of the disclosed functions when executed. Computer-readable medium can be non-volatile, volatile, removable, and non-removable, media implemented in any method or technology for storage of information such as computer readable instructions, data structures, modules or other data. Computer-readable medium can include, but is not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can interface with. Computer-readable medium excludes non-transitory tangible media and propagated data signals.

It will be appreciated that various embodiments of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A charging connector for providing power to a vehicle from a power source, comprising:

a connector body;

a first charging portion within the connector body for charging the vehicle according to a first electric charge protocol, wherein the first charging portion is movable between a first retracted state and a first extended state relative to the connector body;

a second charging portion within the connector body for charging the vehicle according to a second electric charge protocol, wherein the second charging portion is movable between a second retracted state and a second extended state relative to the connector body; and an actuator operatively connected to the connector body configured to selectively move the first charging portion between the first retracted state and the first extended state relative to the connector body, and the second charging portion between the second retracted state and the second extended state relative to the connector body, wherein the actuator is configured to rotate between a first position for charging the vehicle according to the first electric charge protocol, and a second position for charging the vehicle according to the second electric charge protocol.

2. The charging connector of claim 1, wherein the first charging portion is movable between the first retracted state and the first extended state relative to the connector body and the second charging portion.

3. The charging connector of claim 2, wherein the second charging portion is movable between the second retracted state and the second extended state relative to the connector body and the first charging portion.

4. The charging connector of claim 1, wherein when the first charging portion is in the first extended state, the second charging portion is in the second retracted state thereby coupling the first charging portion with the vehicle and charging the vehicle according to the first electric charge protocol.

5. The charging connector of claim 4, wherein when the second charging portion is in the second extended state, the first charging portion is in the first retracted state thereby coupling the second charging portion with the vehicle and charging the vehicle according to the second electric charge protocol.

6. The charging connector of claim 1, wherein a first set of connector pins are housed in the first charging portion and when the first charging portion is in the first extended state, the first set of connector pins extend from the first charging portion allowing the first set of connector pins to couple with the vehicle.

7. The charging connector of claim 6, wherein a second set of connector pins are housed in the second charging portion and when the second charging portion is in the second extended state, the second set of connector pins extend from to the second charging portion allowing the second set of connector pins to couple with the vehicle.

8. The charging connector of claim 1, wherein when the actuator is in the first position the actuator moves the first charging portion to the first extended state and the second charging portion to the second retracted state.

9. The charging connector of claim 8, wherein when the actuator is in the second position the actuator moves the second charging portion to the second extended state and the first charging portion to the first retracted state.

10. The charging connector of claim 1, wherein the actuator is a handle movably affixed to the connector body.

11. A charging system to charge a vehicle, comprising:
a first charging portion with a first set of connector pins for charging the vehicle according to a first electric charge protocol, wherein the first charging portion is movable between a first charging state and a first discharging state for engaging with the vehicle;
a second charging portion with a second set of connector pins for charging the vehicle according to a second electric charge protocol, wherein the second charging portion is movable between a second charging state and a second discharging state for engaging with the vehicle;
a control unit operatively connected for computer communication with the first charging portion and the second charging portion for selectively moving the first charging portion relative to the second charging portion; and an actuator configured to rotate between a first position for charging the vehicle according to the first electric charge protocol and a second position for charging the vehicle according to the second electric charge protocol.

12. The charging system of claim 11, wherein when the first charging portion is in the first charging state, the control unit moves the first charging portion into a first extended state relative to the second charging portion thereby engaging with the vehicle to charge the vehicle according to the first electric charge protocol.

13. The charging system of claim 12, wherein when the second charging portion is in the second charging state, the control unit moves the second charging portion into a second extended state relative to the first charging portion thereby engaging with the vehicle to charge the vehicle according to the second electric charge protocol.

14. The charging system of claim 11, wherein the control unit receives a charging signal indicating a charge protocol, and the control unit controls the first charging portion and the second charging portion according to the charge protocol.

15. A non-transitory computer-readable storage medium including instructions that when executed by a processor, causes the processor to:
receive a charging signal indicating a charge protocol for charging a vehicle;
control a position of a first charging portion relative to a position of a second charging portion based on the charge protocol, wherein the first charging portion is capable of charging the vehicle according to a first charge protocol and the second charging portion is capable of charging the vehicle according to a second charge protocol; and
operate an actuator configured to rotate between a first position and a second position to control charging based on a selected charge protocol.

16. The non-transitory computer-readable storage medium of claim 15, wherein when the charge protocol is the first charge protocol, further causes the processor to extend the first charging portion relative to the second charging portion thereby engaging with the vehicle to charge the vehicle according to the first charge protocol.

17. The non-transitory computer-readable storage medium of claim 16, further causes the processor to retract the second charging portion relative to the first charging portion.

18. The non-transitory computer-readable storage medium of claim 15, wherein when the charge protocol is the second charge protocol, further causes the processor to extend the second charging portion relative to the first charging portion thereby engaging with the vehicle to charge the vehicle according to the second charge protocol.

19. The non-transitory computer-readable storage medium of claim 18, further causes the processor to retract the first charging portion relative to the second charging portion.

* * * * *